(12) United States Patent
Kirschner et al.

(10) Patent No.: US 11,366,899 B2
(45) Date of Patent: Jun. 21, 2022

(54) DIGITAL FAULT INJECTION DETECTOR (71) Applicant: Nuvoton Technology Corporation, Hsin-chu (TW)

(72) Inventors: Yuval Kirschner, Even Yehuda (IL); Ziv Hershman, Givat Shmuel (IL); Tamir Golan, Kibbutz Givat-Chaim Meuchad (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 146 days.

(21) Appl. No.: 16/792,913

(22) Filed: Feb. 18, 2020

(65) Prior Publication Data

US 2021/0256119 A1 Aug. 19, 2021

(51) Int. Cl.
*G06F 21/55* (2013.01)
*G06F 21/71* (2013.01)
*G06F 21/57* (2013.01)

(52) U.S. Cl.
CPC .......... *G06F 21/556* (2013.01); *G06F 21/554* (2013.01); *G06F 21/577* (2013.01); *G06F 21/71* (2013.01)

(58) Field of Classification Search
CPC ........ G06F 21/55; G06F 21/71; G06F 21/577; G06F 21/554
See application file for complete search history.

(56) References Cited

U.S. PATENT DOCUMENTS

| 4,860,288 | A | 8/1989 | Teske et al. |
| 5,867,409 | A | 2/1999 | Nozuyama |
| 6,154,045 | A | 11/2000 | Ye et al. |
| 6,385,176 | B1 | 5/2002 | Iyengar et al. |
| 6,735,732 | B2 | 5/2004 | Yamada |
| 6,844,761 | B2 | 1/2005 | Byun et al. |
| 7,702,992 | B2 | 4/2010 | Ogawa |
| 7,770,049 | B1 | 8/2010 | Searles et al. |
| 8,352,752 | B2* | 1/2013 | Croguennec ............. G11C 7/24 713/194 |
| 8,412,988 | B2* | 4/2013 | Bancel ...................... G06F 1/10 714/724 |
| 8,542,177 | B2 | 9/2013 | Lee |
| 8,946,859 | B2* | 2/2015 | Lisart .................... H01L 21/763 257/547 |
| 9,311,477 | B2* | 4/2016 | Marinet ................ G06F 11/006 |

(Continued)

FOREIGN PATENT DOCUMENTS

| CN | 101192820 A | 6/2010 |
| KR | 101352149 B1 | 1/2014 |

*Primary Examiner* — Viral S Lakhia
(74) *Attorney, Agent, or Firm* — Kligler & Associates Patent Attorneys Ltd (57) ABSTRACT

A secure Integrated Circuit (IC) includes functional circuitry, and protection circuitry configured to protect the functional circuitry against fault-injection attacks. The protection circuitry includes a plurality of digital detection cells, and protection logic. The detection cells have respective inputs and outputs and are connected output-to-input in at least a chain. In response to a fault-injection attack, a given detection cell in the chain is configured to toggle an output that drives an input of a subsequent detection cell in the chain, thereby causing a pulse to propagate along the chain. The protection logic is configured to receive the pulse from the chain and initiate a responsive action.

16 Claims, 4 Drawing Sheets

(56) References Cited

U.S. PATENT DOCUMENTS

| | | |
|---|---|---|
| 9,523,736 B2 * | 12/2016 | Hershman ............. H01L 23/576 |
| 10,013,581 B2 | 7/2018 | Hershman |
| 10,181,851 B2 * | 1/2019 | Maharrey ........ H03K 19/00338 |
| 10,303,903 B2 * | 5/2019 | Martin .................... G06F 21/86 |
| 10,365,327 B2 * | 7/2019 | Bose ..................... G06F 30/327 |
| 10,984,845 B2 * | 4/2021 | Moisuc ................... G11C 8/20 |
| 2005/0235179 A1 | 10/2005 | Pistoulet |
| 2007/0075746 A1 | 4/2007 | Fruhauf et al. |
| 2008/0284483 A1 | 11/2008 | Nakashima |
| 2009/0315603 A1 | 12/2009 | Bancel et al. |
| 2010/0026358 A1 | 2/2010 | Bancel et al. |
| 2011/0029828 A1 | 2/2011 | Bancel et al. |
| 2011/0234307 A1 | 9/2011 | Marinet et al. |
| 2013/0061104 A1 | 3/2013 | Hart |
| 2013/0099844 A1 | 4/2013 | Kawaoka |
| 2013/0113572 A1 | 5/2013 | Sharda et al. |
| 2013/0305078 A1 | 11/2013 | Lee et al. |
| 2014/0075255 A1 | 3/2014 | Lee et al. |
| 2014/0219406 A1 | 8/2014 | Chen et al. |
| 2015/0121327 A1 | 4/2015 | Kamal et al. |
| 2015/0269298 A1 | 9/2015 | Dai et al. |
| 2015/0280722 A1 | 10/2015 | Liu et al. |
| 2015/0323959 A1 | 11/2015 | Arabi |
| 2015/0364433 A1 * | 12/2015 | Hindman ............... H03K 3/356 326/16 |
| 2016/0028381 A1 | 1/2016 | Tasher |
| 2016/0028394 A1 | 1/2016 | Tasher et al. |
| 2017/0124323 A1 * | 5/2017 | Teglia ....................... G06F 7/58 |
| 2017/0228562 A1 * | 8/2017 | Guilley ................... H04L 9/002 |
| 2017/0329728 A1 * | 11/2017 | Karri ....................... G06F 21/79 |
| 2018/0075888 A1 * | 3/2018 | Le Roy ..................... G09C 1/00 |
| 2018/0232542 A1 * | 8/2018 | Martin .................. H01L 23/576 |
| 2018/0367143 A1 * | 12/2018 | Maharrey ........ H03K 19/00338 |
| 2019/0113572 A1 * | 4/2019 | Bose ..................... G06F 30/327 |
| 2020/0067693 A1 * | 2/2020 | Lhermet ................. G06F 21/72 |
| 2021/0232679 A1 * | 7/2021 | Hershman ............. G06F 21/554 |

\* cited by examiner

DIGITAL FAULT INJECTION DETECTOR

FIELD OF THE INVENTION

The present invention relates generally to data security in electronic circuitry, and particularly to methods and systems for detection of fault injection attacks.

BACKGROUND OF THE INVENTION

Fault injection attacks are a family of techniques used for accessing, analyzing or extracting information from secure electronic circuitry, such as cryptographic circuitry. A fault injection attack typically involves causing a circuit, or a part thereof, to change its logical state and change its behavior in a way that assists the attacker in penetrating the circuit or the information it stores. A fault injection attack may be launched, for example, by physically contacting signal lines, by applying high-power laser or electromagnetic pulses, or by causing glitches on power supply or other external interfaces. Various techniques for detecting and/or mitigating fault injection attacks are known in the art.

SUMMARY OF THE INVENTION

An embodiment of the present invention that is described herein provides a secure Integrated Circuit (IC) including functional circuitry, and protection circuitry configured to protect the functional circuitry against fault-injection attacks. The protection circuitry includes a plurality of digital detection cells, and protection logic. The detection cells have respective inputs and outputs and are connected output-to-input in at least a chain. In response to a fault-injection attack, a given detection cell in the chain is configured to toggle an output that drives an input of a subsequent detection cell in the chain, thereby causing a pulse to propagate along the chain. The protection logic is configured to receive the pulse from the chain and initiate a responsive action.

In some embodiments, the functional circuitry is implemented from multiple standard cells selected from a library, and the detection cells also include standard cells selected from the library. In some embodiments, the detection cells include inverters. In an embodiment, the inverters in even detection cells in the chain have a drive-strength that is stronger in driving a first logic level than in driving a second logic level, and the inverters in odd detection cells in the chain have a drive-strength that is stronger in driving the second logic level than in driving the first logic level. In another embodiment, at least one of the detector cells has a weaker drive strength when driving a normal logic level associated with absence of the fault-injection attack, and a stronger drive strength when driving an abnormal logic level associated with presence of the fault-injection attack.

In yet another embodiment, one or more of the detection cells include respective coils connected between the inputs and the inverters. In an example embodiment, in at least one of the detection cells, the inverter has an active area that is sensitive to optical fault-injection, and the coil coupled to the inverter is disposed over the active area and shaped to guide optical radiation to the active area.

In a disclosed embodiment, at least one of the detection cells includes a semiconductor device having an active area that is sensitive to optical fault-injection, and the IC further includes a metal layer that masks the active area from the optical fault-injection. In another embodiment, at least one of the detection cells is configured to receive the pulse with a first pulse-width, and to output the pulse with a second pulse-width that is larger than the first pulse-width.

There is additionally provided, in accordance with an embodiment of the present invention, a method for securing functional circuitry in an Integrated Circuit (IC). The method includes operating, in the IC, a plurality of digital detection cells that have respective inputs and outputs and are connected output-to-input in at least a chain. In response to a fault-injection attack, an output of a given detection cell in the chain is toggled so as to drive an input of a subsequent detection cell in the chain, thereby causing a pulse to propagate along the chain. The pulse is received from the chain, and a responsive action is initiated.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and apparatus for protecting against fault injection attacks. The disclosed techniques can be implemented in various types of Integrated Circuits (ICs), such as in secure cryptographic processors or secure Non-Volatile Memory (NVM) devices.

In some embodiments, a secure IC comprises functional circuitry, and protection circuitry that protects the functional circuitry against fault-injection attacks. The protection circuitry comprises a plurality of digital detection circuits, also referred to herein as detection cells, which are distributed over at least part of the IC area. The detection cells are connected output-to-input in at least a chain, e.g., in a single chain, in multiple chains, or in a tree topology, for example.

Each detection cell is configured to detect characteristics indicative of a fault-injection attack occurring in its vicinity, e.g., electromagnetic (EM) pulses and/or optical (e.g., laser) pulses, and in response toggle its logic output from a default value to an abnormal value. In response to a fault-injection attack that affects a certain detection cell in the chain, the detection cell is configured to toggle its output, and to drive the input of a subsequent detection cell in the chain with the abnormal output, thereby causing a pulse to propagate along the chain. The protection circuitry further comprises protection logic, which is configured to receive the pulse from the chain and initiate a responsive action.

In some embodiments, the detection cells are implemented using digital standard-cells, i.e., cells drawn from the same digital design library used for designing the functional circuitry. This implementation enables accurate control over the sensitivity of the detection cells to fault-injection attacks, relative to the sensitivity of the functional circuitry. Consequently, it is possible to reliably tune the detection probability and the false-alarm probability of individual detection cells and of the protection circuitry as a whole. Implementation using standard-cells also makes the detection logic sensitive to any fault injection method that is effective in attacking the standard cells, and makes the detection logic less visible, compared to non-standard detection cells.

Various examples of detection cells are described herein. In some embodiments each detection cell comprises an inverter (a NOT gate), the input of the first inverter in the chain is set to a constant logic level, and the output of the last inverter in the chain is connected to an input of a Flip-Flop (FF). The output of this FF triggers the protection logic to initiate a responsive action. In some embodiments, each detection cell comprises a coil that is coupled to the input of the respective inverter, for achieving high sensitivity to EM radiation.

In some embodiments, the drive-strengths of the inverters are deliberately made imbalanced—The inverters are set to drive a higher current when outputting the abnormal logic level. Such drive-strength imbalance is another way of increasing the detection cell's sensitivity to fault injection. Another advantage of an imbalanced inverter is that the pulse at the inverter output is wider than the pulse at the input. As a result, the pulse becomes progressively longer as it propagates along the chain, and therefore triggers the protection logic reliably.

In some embodiments, the inverter has an active area that is sensitive to optical radiation and, when irradiated, toggles the inverter output to the abnormal logic level. This active area is used for detecting optical fault injection, instead of or in addition to detection of EM fault injection. In one embodiment, a coil coupled to the inverter is disposed over the active area and shaped to guide optical radiation to the active area. An example implementation of such a detection cell, using a stack of multiple metal layers, is described herein.

By the same token, the inverter may have an active area that, when irradiated, strengthens the default normal logic level at the inverter output. In an embodiment, this active area may be masked by one or more metal layers.

Various additional examples of detection cells and protection circuits are described herein. The disclosed methods and systems are highly effective in detecting fault-injection attacks. At the same time, the disclosed protection schemes are simple to implement, as an integral part of the IC design and production process.

System Description

Figure 1:
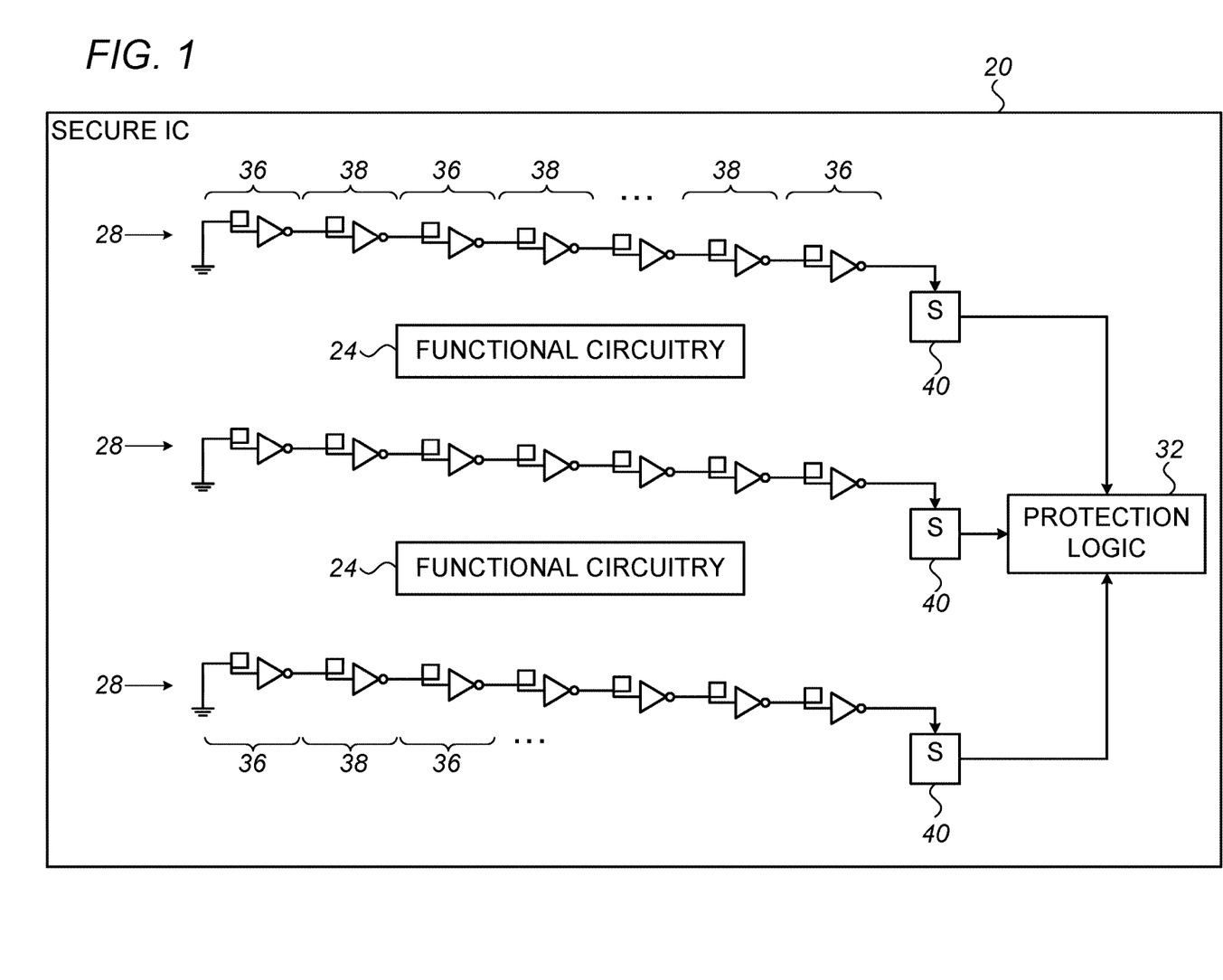
FIG. 1 is a block diagram that schematically illustrates a secure Integrated Circuit (IC) comprising digital fault-injection detection circuitry, in accordance with an embodiment of the present invention.

FIG. 1 is a block diagram that schematically illustrates a secure Integrated Circuit (IC) 20 comprising digital fault-injection detection circuitry, in accordance with an embodiment of the present invention. Secure IC 20 may comprise, for example, a secure processor used for performing cryptographic operations, a secure memory used for storing sensitive information, or any other suitable type of IC.

IC 20 comprises functional circuitry 24. The term "functional circuitry" refers to circuitry that is configured to perform the designated functions of IC 20, e.g., various processing and/or data storage operations. In addition, IC 20 comprises protection circuitry that is configured to protect functional circuitry 24 against fault-injection attacks.

The description that follows refers mainly to two types of fault-injection attacks, namely electromagnetic (EM) fault injection and optical fault injection. In a typical EM fault-injection attack, a strong EM pulse is applied to a target region of the IC. The EM pulse induces a magnetic field that may change the logical states of signals that are routed in metallic interconnections in the target region. For example, EM pulses may toggle a clock signal, force a reset signal to be active, or change a data value.

In a typical optical fault-injection attack, a short and strong pulse of light is applied to a target region of the IC, usually from the backside. Such a pulse may, for example, hit the active area of a transistor, change the transistor's state and switch its logical value.

In the example of FIG. 1, the protection circuitry comprises multiple chains 28 of digital detection cells 36 and 38, one or more Flip-Flops (FFs) 40 connected to the respective chains 28, and protection logic 32 connected to FFs 40. (Possible differences between odd-order logic cells 36 and even-order logic cells 38 in chains 28 are addressed further below.)

In the present example, each detection cell comprises a respective inverter (a NOT gate), and a respective coil connected to the input of the inverter. The coil is coupled to sense EM radiation in its vicinity—The magnetic field associated with the EM radiation induces a voltage across the coil. Each inverter is configured to output a default normal logic level under normal conditions, and to toggle its output to an abnormal logic level in response to sensing a possible fault injection attack. The coil increase the detection cell's sensitivity to EM radiation that may be indicative of fault injection.

In the example of FIG. 1, each chain 28 comprises an odd number of detection cells that are connected in cascade, i.e., the output of one detection cell drives the input of the next detection cell in the chain. The input of the first detection cell in chain 28 is connected to a fixed logic "0" level, e.g., to a grounded test pin of the IC. The output of the last detection cell in the chain drives an asynchronous, active-low SET input of a FF 40. The output of FF 40 triggers protection logic 32. The values stored in FFs 40 are typically initialized (reset) to "0" after reset of IC 20.

The configuration of FIG. 1 shows multiple separate chains 28 that each triggers logic 32 using a respective FF 40. This configuration is depicted purely by way of example. In alternative embodiments, detection cells 36 and 38 may be connected in any other suitable topology, e.g., in a single chain, in a tree topology, or in multiple trees, for example.

Detection cells 36 and 38 may be placed at any suitable locations in IC 20, e.g., distributed evenly over the entire IC area, concentrated in a specific area of the IC that warrants protection, interleaved between portions of functional circuitry 24, or in any other suitable way. Typically, the density of detection cells per unit area determines the detection probability of the protection circuitry. The detection cells may be laid in straight lines, in a grid pattern, in a serpentine or zig-zag arrangement, in a spiral configuration, or in any other suitable geometry.

The metal conductors that connect the detector cells to one another typically have a fan-in of 1, a fan-out of 1, and are typically of minimal length. As such, the interconnections between detection cells have a very small capacitance, and are therefore highly sensitive to EM radiation.

Under normal conditions, i.e., in absence of a suspected attack, the inverters in a given chain 28 output normal logic levels that alternate between "1" and "0". The inverters in odd-order cells 36 normally output a logic "1", and the inverters in even-order cells 38 normally output a logic "0". The last logic cell in the chain normally outputs a logic "0" and thus FF 40 is not set.

Consider now a scenario in which an EM fault injection attack is attempted in the vicinity of a certain detection cell (36 or 38) in chain 28. The attacking EM beam induces a voltage in the coil of the detection cell, causing the output of the detection cell to toggle to the abnormal logic level. (An odd-order cell 36 would toggle its output from "0" to "1". An even-order cell 38 would toggle its output from "1" to "0".)

Thus, in the event of an EM fault injection attack, at least one detection cell outputs a pulse of abnormal logic level. This pulse drives the input of the next detection cell in chain 28, causing the next detection cell to also toggle its output and produce a pulse of an abnormal logic level. The pulse of abnormal logic level propagates from one detection cell to the next, finally setting FF 40 at the end of the chain and triggering protection logic 32.

When triggered by a FF 40, protection logic 32 may perform or initiate any suitable responsive action, e.g., reset the hardware of IC 20, indicate to firmware of IC 20 (e.g., using a non-maskable interrupt—NMI) that an attack is suspected, issue an alert to a host or to a human user, shut-down some or all of functional circuitry 24, or erase sensitive data from IC 20, for example.

Example Detection Cell Configurations

In some embodiments, detection cells 36 and 38 are implemented using digital standard-cells, i.e., cells drawn from the same digital design library used for designing functional circuitry 24. In some embodiments odd-order detection cells 36 differ from even-order detection cells 38, in which case two types of dedicated standard cells are defined in the design library.

In some embodiments, the sensitivity of a detection cell to attack (EM or optical) is enhanced by deliberately creating an imbalance in the drive-strength of the inverter. Specifically, the inverter is set to drive a certain electrical current (certain drive-strength) when outputting the abnormal logic level, and a higher electrical current (higher drive-strength) when outputting the abnormal logic level. It is possible to mix in the chains detection cells of several types—and enjoy the benefits of each type.

Referring to the example of FIG. 1, the normal logic level at the outputs of odd-order detection cells 36 is "1", and the abnormal logic level (indicative of an attack) is "0". For even-order detection cells 38, on the other hand, the normal logic level of the outputs is "0", and the abnormal logic level is "1". Therefore, in some embodiments, the inverters of detection cells 36 are set to have a stronger drive-strength when outputting "0" than when outputting "1", and the inverters of detection cells 38 are set to have a stronger drive-strength when outputting "1" than when outputting "0".

When using an inverter having an imbalanced drive-strength, the rise time of the pulse at the inverter output is fast due to the large drive-strength of the abnormal logic level. The decay time of the pulse, on the other hand, is slower, due to the smaller drive-strength of the normal logic level. As a result, the pulse width increases as the pulse propagates from one detection cell to the next along chain 28. The pulse arriving at FF 40 is therefore likely to be long and well-defined, even if the initial pulse at the input of the first detection cell that detected the attack is narrow.

Figure 2:
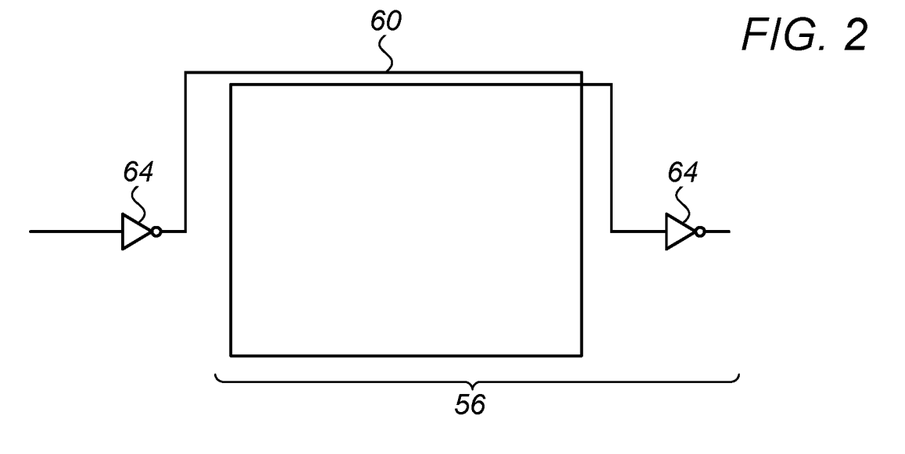
FIGS. 2 and 3 are block diagrams that schematically illustrate fault-injection detection cells, in accordance with embodiments of the present invention.

FIG. 2 is a block diagram that schematically illustrates a fault-injection detection cell 56, in accordance with an embodiment of the present invention. Detection cells of this sort can be used for implementing detection cells 36 and/or 38 of FIG. 1 above. In the example of FIG. 2, detection cell 56 comprises a coil 60 coupled to the input of an inverter 64. (The figure also shows an inverter 64 of a preceding detection cell in the chain, whose output is coupled to coil 60.)

In the present example, coil 60 comprises a single planar loop that surrounds a relatively large area of IC 20. Such a coil can be fabricated, for example, using metallic traces belonging to one or two of the metal layers of IC 20.

Figure 3:
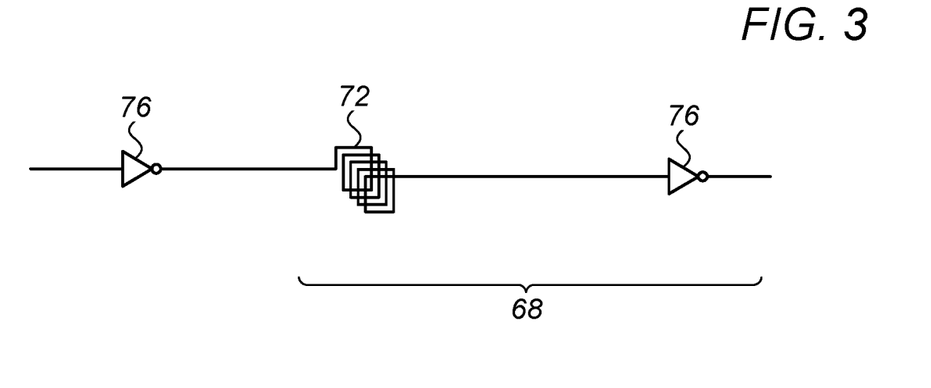

FIG. 3 is a block diagram that schematically illustrates a fault-injection detection cell 68, in accordance with an alternative embodiment of the present invention. Detection cells of this sort, too, can be used for implementing detection cells 36 and/or 38 of FIG. 1 above. In the example of FIG. 3, detection cell 68 comprises a coil 72 coupled to the input of an inverter 76. (The figure also shows an inverter 76 of a preceding detection cell in the chain, whose output is coupled to coil 72.)

In the present example, coil 72 comprises multiple loops (windings) that surrounds a relatively small area of IC 20. Such a coil can be fabricated, for example, using metallic traces belonging to multiple metal layers of IC 20 (e.g., "metal 1", "metal 2", "metal 3", . . . , and "top metal" layers). Interconnections between the layers may be implemented, for example, using via holes ("vias"). Coil 72 has a relatively high inductance and low capacitance.

By using coils (60 or 72), the detection cells (36, 38, 56 or 68) can be designed to be more sensitive to EM attacks than functional circuitry 24. In alternative embodiments, the detection cells can be designed to have similar sensitivity to EM attack as the functional circuitry, e.g., by omitting the coils. In such an implementation, the EM radiation is sensed by the interconnections between the inverters, which typically have similar sensitivity as the interconnections in the functional circuitry.

Sensing of Optical Fault Injection

In some embodiments, the inverters (e.g., inverters 64 or 76) of the detection cells (e.g., cells 36, 38, 56 or 68) are configured to sense optical radiation, and to output an electrical pulse in response to sensing an optical pulse (e.g., laser pulse). Typically, an optical pulse is sensed by the active area of a semiconductor device (e.g., diode or transistor) in the inverter.

In an example embodiment, the active area that is sensitive to optical radiation is a reverse-biased PN diode in the inverter. A laser pulse hitting a reverse-biased diode generates a reverse current pulse through the diode.

Consider, for example, a CMOS inverter comprising two transistors. At any given time one transistor is ON and the other transistor is OFF. The drain of the OFF transistor has a reverse-biased PN junction (the parasitic diode from drain to bulk). A laser pulse hitting this reverse-biased diode may turn the diode on, and thus toggle the inverter output.

In some embodiments, the active area is increased deliberately, in order to increase the sensitivity of the inverter (and thus of the detection cell) to optical radiation. In the example of a CMOS inverter, the drain area (the active area of the transistor that connects to the inverter cell output) of the OFF transistor can be made larger than the drain area of the ON transistor, in order to increase the probability of toggling the inverter output in response to an optical pulse. In the present context, the term "OFF transistor" refers to the transistor that is OFF under normal conditions, i.e., while the inverter outputs its default normal logic level in absence of an attack. The identity of the OFF transistor may differ from one inverter to another, e.g., between odd-order detection cells 36 and even-order detection cells 38 in FIG. 1.

When an optical fault-injection attack is applied from the backside of IC 20, all transistors are equally exposed (but different active area dimensions may be used to control the sensitivity to light energy). On the other hand, when an optical fault-injection attack is applied from the front side of the IC, the impact of the attack depends on the metal layers that interpose between the attack and the transistors. A transistor, or part thereof, that is covered by one or more metal layers will typically be less sensitive to optical pulses from the front side, and vice versa.

In some embodiments, the layout of the metal layers in the detection cells is designed to enhance the sensitivity of the detection cell to optical attacks. For example, in the above-described CMOS inverter, the area above the drain of the OFF transistor may be deliberately kept free of metal in order to enable optical pulses to reach it. Additionally or alternatively, the area above the drain of the ON transistor may be deliberately masked by metal in order to block optical pulses.

Figure 4:
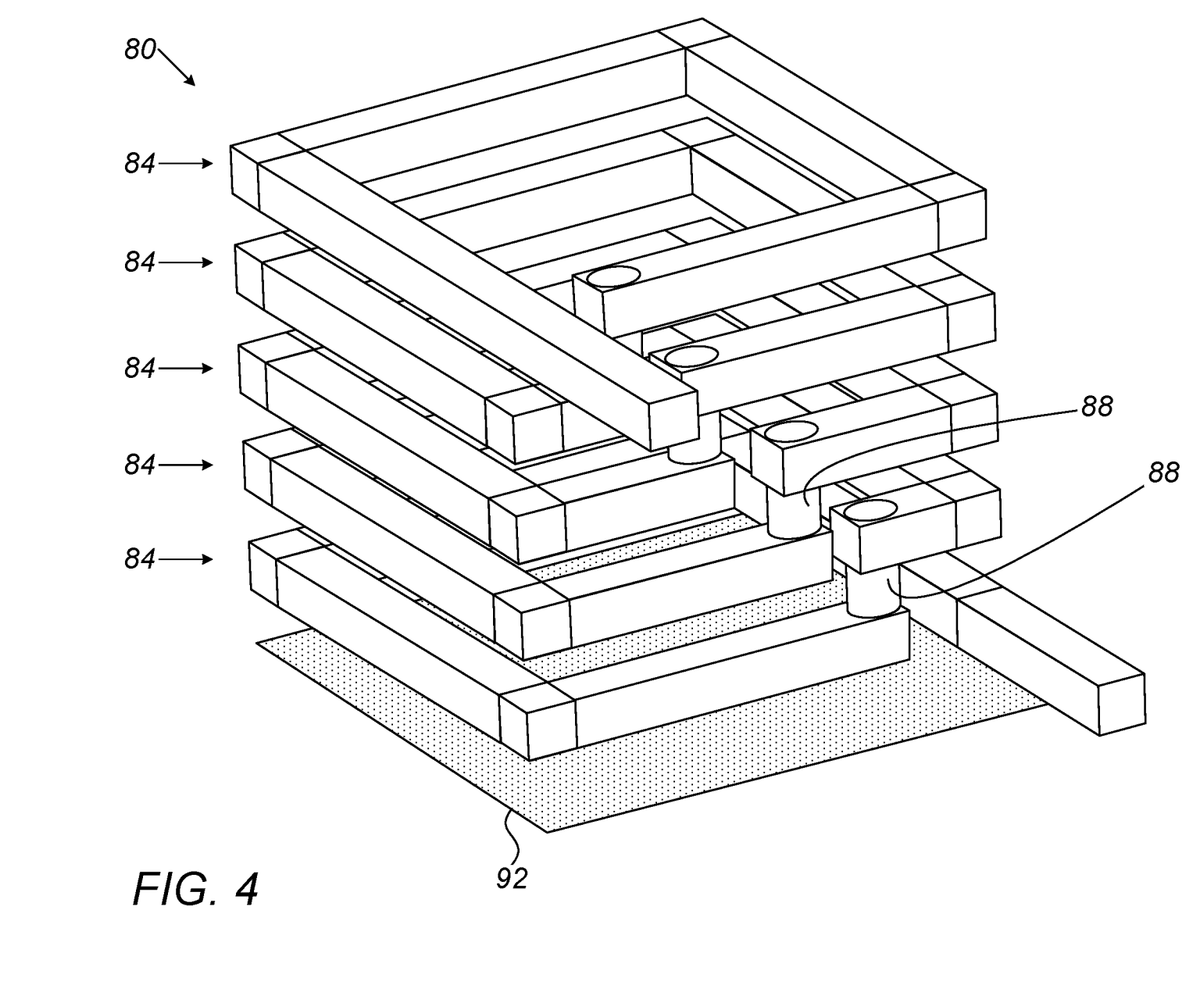
FIG. 4 is a diagram showing a three-dimensional (3-D) configuration of a fault-injection detection cell, in accordance with an embodiment of the present invention.

FIG. 4 is a diagram showing a three-dimensional (3-D) configuration of a fault-injection detection cell 80, in accordance with an embodiment of the present invention. Detection cell 80 comprises a coil made of multiple loops 84, in the present example five loops. The loops are implemented one above the other in respective metal layers. The dielectric layers that separate between the metal layers are not shown for the sake of clarity.

Interconnections between loops 84 are implemented using vias 88 that connect adjacent metal layers.

A shaded area 92 at the bottom of the figure illustrates the active area of the OFF transistor in the inverter of detection cell 80. The other elements of the inverter are not shown, for the sake of clarity. In this implementation, the metallic loops of the coil also serve as a "light tunnel" that is shaped to guide optical radiation to area 92. In the present example the 3-D shape of the coil is cubical or box-shaped. In alternative embodiments the 3-D shape of the coil can be made conical, pyramid-shaped, funnel-shaped, or any other shape that gradually narrows down toward area 92. Shapes of these sort are able to collect light from a larger angular sector.

The configurations of the electronic devices and circuits shown in FIGS. 1-4 are example configurations that are depicted purely for the sake of conceptual clarity. In alternative embodiments, any other suitable configurations can be used. For example, it is not mandatory for odd-order detection cells to differ from even-order detection cells.

In various embodiments, any of the disclosed the electronic devices and circuits may be implemented using any suitable hardware, such as using one or more discrete components, one or more Application-Specific Integrated Circuits (ASICs) and/or one or more Field-Programmable Gate Arrays (FPGAs).

Fault-Injection Detection Method

Figure 5:
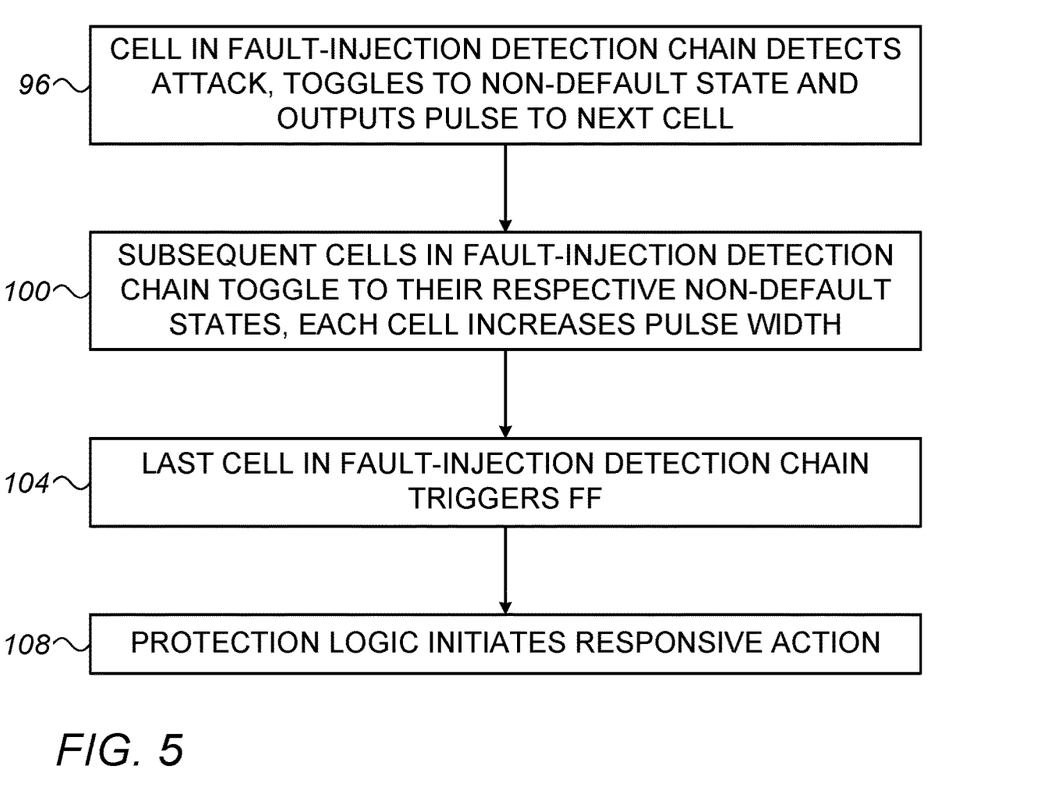
FIG. 5 is a flow chart that schematically illustrates a method for fault-injection detection, in accordance with an embodiment of the present invention.

FIG. 5 is a flow chart that schematically illustrates a method for fault-injection detection, in accordance with an embodiment of the present invention. The method is carried out by the protection circuitry of IC 20.

The method begins with a certain detection cell (36 or 38) in a certain chain 28 detecting a fault-injection attack (EM or optical), at a detection step 96. In response to the detection, as explained above, the detection cell toggles from its default logical state to the abnormal logical state, and thus outputs an electrical pulse to the next detection cell in the chain.

At a propagation step 100, the pulse propagates from one detection cell to the next along chain 28. At a triggering step 104, the last detection cell in chain 28 sets FF 40, which in turn triggers protection logic 32. At a response step 108, protection logic 32 initiates a suitable responsive action.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A secure Integrated Circuit (IC), comprising:
    functional circuitry; and
    protection circuitry, which is configured to protect the functional circuitry against fault-injection attacks, the protection circuitry comprising:
        a plurality of digital detection cells, the detection cells having respective inputs and outputs and connected output-to-input in at least a chain, wherein the detection cells comprise inverters, wherein one or more of the detection cells comprise respective coils connected between the inputs and the inverters, wherein in at least one of the detection cells the inverter has an active area that is sensitive to optical fault-injection, wherein the coil coupled to the inverter is disposed over the active area and shaped to guide optical radiation to the active area, and wherein, in response to a fault-injection attack, a given detection cell in the chain is configured to toggle an output that drives an input of a subsequent detection cell in the chain, thereby causing a pulse to propagate along the chain; and
        protection logic, configured to receive the pulse from the chain and initiate a responsive action.

2. The secure IC according to claim 1, wherein the functional circuitry is implemented from multiple standard cells selected from a library, and wherein the detection cells also comprise standard cells selected from the library.

3. The secure IC according to claim 1, wherein the inverters in even detection cells in the chain have a drive-strength that is stronger in driving a first logic level than in driving a second logic level, and wherein the inverters in odd detection cells in the chain have a drive-strength that is stronger in driving the second logic level than in driving the first logic level.

4. The secure IC according to claim 1, wherein at least one of the detector cells has a weaker drive strength when driving a normal logic level associated with absence of the fault-injection attack, and a stronger drive strength when driving an abnormal logic level associated with presence of the fault-injection attack.

5. The secure IC according to claim 1, wherein at least one of the detection cells comprises a semiconductor device having an active area that is sensitive to optical fault-injection, and further comprising a metal layer that masks the active area from the optical fault-injection.

6. The secure IC according to claim 1, wherein at least one of the detection cells is configured to receive the pulse with a first pulse-width, and to output the pulse with a second pulse-width that is larger than the first pulse-width.

7. A method for securing functional circuitry in an Integrated Circuit (IC), the method comprising:
operating, in the IC, a plurality of digital detection cells that have respective inputs and outputs and are connected output-to-input in at least a chain, wherein the detection cells comprise inverters, wherein one or more of the detection cells comprise respective coils connected between the inputs and the inverters, wherein in at least one of the detection cells, the inverter has an active area that is sensitive to optical fault-injection, wherein the coil coupled to the inverter is disposed over the active area and shaped to guide optical radiation to the active area;
in response to a fault-injection attack, toggling an output of a given detection cell in the chain so as to drive an input of a subsequent detection cell in the chain, thereby causing a pulse to propagate along the chain; and
receiving the pulse from the chain and initiating a responsive action.

8. The method according to claim 7, wherein the functional circuitry is implemented from multiple standard cells selected from a library, and wherein the detection cells also comprise standard cells selected from the library.

9. The method according to claim 7, wherein the inverters in even detection cells in the chain have a drive-strength that is stronger in driving a first logic level than in driving a second logic level, and wherein the inverters in odd detection cells in the chain have a drive-strength that is stronger in driving the second logic level than in driving the first logic level.

10. The method according to claim 7, wherein at least one of the detector cells has a weaker drive strength when driving a normal logic level associated with absence of the fault-injection attack, and a stronger drive strength when driving an abnormal logic level associated with presence of the fault-injection attack.

11. The method according to claim 7, wherein at least one of the detection cells comprises a semiconductor device having an active area that is sensitive to optical fault-injection, and wherein the IC further comprises a metal layer that masks the active area from the optical fault-injection.

12. The method according to claim 7, and comprising, in at least one of the detection cells, receiving the pulse with a first pulse-width, and outputting the pulse with a second pulse-width that is larger than the first pulse-width.

13. A secure Integrated Circuit (IC), comprising:
functional circuitry; and
protection circuitry, which is configured to protect the functional circuitry against fault-injection attacks, the protection circuitry comprising:
a plurality of digital detection cells, wherein the detection cells comprise inverters and have respective inputs and outputs and connected output-to-input in at least a chain, wherein the inverters in even detection cells in the chain have a drive-strength that is stronger in driving a first logic level than in driving a second logic level, wherein the inverters in odd detection cells in the chain have a drive-strength that is stronger in driving the second logic level than in driving the first logic level, and wherein, in response to a fault-injection attack, a given detection cell in the chain is configured to toggle an output that drives an input of a subsequent detection cell in the chain, thereby causing a pulse to propagate along the chain; and
protection logic, configured to receive the pulse from the chain and initiate a responsive action.

14. A secure Integrated Circuit (IC), comprising:
functional circuitry; and
protection circuitry, which is configured to protect the functional circuitry against fault-injection attacks, the protection circuitry comprising:
a plurality of digital detection cells, wherein the detection cells comprise inverters and have respective inputs and outputs and connected output-to-input in at least a chain, wherein at least one of the detector cells has a weaker drive strength when driving a normal logic level associated with absence of the fault-injection attack, and a stronger drive strength when driving an abnormal logic level associated with presence of the fault-injection attack, and wherein, in response to a fault-injection attack, a given detection cell in the chain is configured to toggle an output that drives an input of a subsequent detection cell in the chain, thereby causing a pulse to propagate along the chain; and
protection logic, configured to receive the pulse from the chain and initiate a responsive action.

15. A method for securing functional circuitry in an Integrated Circuit (IC), the method comprising:
operating, in the IC, a plurality of digital detection cells that have respective inputs and outputs and are connected output-to-input in at least a chain, wherein the detection cells comprise inverters, wherein the inverters in even detection cells in the chain have a drive-strength that is stronger in driving a first logic level than in driving a second logic level, and wherein the inverters in odd detection cells in the chain have a drive-strength that is stronger in driving the second logic level than in driving the first logic level;
in response to a fault-injection attack, toggling an output of a given detection cell in the chain so as to drive an input of a subsequent detection cell in the chain, thereby causing a pulse to propagate along the chain; and
receiving the pulse from the chain and initiating a responsive action.

16. A method for securing functional circuitry in an Integrated Circuit (IC), the method comprising:
operating, in the IC, a plurality of digital detection cells that have respective inputs and outputs and are connected output-to-input in at least a chain, wherein the detection cells comprise inverters, and wherein at least one of the detector cells has a weaker drive strength when driving a normal logic level associated with absence of the fault-injection attack, and a stronger drive strength when driving an abnormal logic level associated with presence of the fault-injection attack;
in response to a fault-injection attack, toggling an output of a given detection cell in the chain so as to drive an input of a subsequent detection cell in the chain, thereby causing a pulse to propagate along the chain; and receiving the pulse from the chain and initiating a responsive action.

\* \* \* \* \*